(12) United States Patent
Fu et al.

(10) Patent No.: US 11,578,831 B1
(45) Date of Patent: Feb. 14, 2023

(54) MULTIFUNCTIONAL LIGHT-DUTY SOFT ROBOT

(71) Applicant: Guangzhou University, Guangzhou (CN)

(72) Inventors: Jiyang Fu, Guangzhou (CN); Jiaqiao Liang, Guangzhou (CN); Xiaolin Zhang, Guangzhou (CN); Airong Liu, Guangzhou (CN); Bingcong Chen, Guangzhou (CN); Xijun Ye, Guangzhou (CN); Jialin Wang, Guangzhou (CN); Jialing Song, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/750,795

(22) Filed: May 23, 2022

(30) Foreign Application Priority Data

Jan. 14, 2022 (CN) .......................... 202210043386.9

(51) Int. Cl.
| | | |
|---|---|---|
| *B62D 55/06* | (2006.01) | |
| *F16L 55/32* | (2006.01) | |
| *B62D 55/065* | (2006.01) | |
| *G01N 21/954* | (2006.01) | |
| *G01N 21/952* | (2006.01) | |
| *B62D 57/024* | (2006.01) | |
| *F16L 101/30* | (2006.01) | |

(52) U.S. Cl.
CPC ............ *F16L 55/32* (2013.01); *B62D 55/065* (2013.01); *B62D 57/024* (2013.01); *G01N 21/952* (2013.01); *G01N 21/954* (2013.01); *F16L 2101/30* (2013.01); *G01N 2021/9548* (2013.01)

(58) Field of Classification Search
CPC .... F16L 55/32; F16L 2101/30; B62D 55/065; B62D 57/024; G01N 21/952; G01N 21/954; G01N 2021/9548
See application file for complete search history.

(56) References Cited

U.S. PATENT DOCUMENTS

| | | | |
|---|---|---|---|
| 11,143,599 B2 * | 10/2021 | Morris | ................. B62D 55/065 |
| 2012/0197440 A1 * | 8/2012 | Farkavec | ................ B08B 9/049 901/1 |
| 2021/0310597 A1 * | 10/2021 | Takashima | ............... B25J 11/00 |

* cited by examiner

*Primary Examiner* — Kevin Hurley
*Assistant Examiner* — Marlon A Arce
(74) *Attorney, Agent, or Firm* — Getech Law LLC; Jun Ye

(57) ABSTRACT

A multifunctional light-duty soft robot includes paired wheel power mechanisms, soft contact mechanisms, buffer spring mechanisms and a middle frame deformation mechanism. Each of the paired wheel power mechanisms includes a wheel frame and a wheel rotatably connected thereto. The wheel frame is internally provided with a power mechanism connected with a wheel axis of the wheel. Each of the soft contact mechanisms includes a flexible cantilever and a soft transmission belt. The two paired wheel power mechanisms are respectively arranged at two ends of each of the flexible cantilevers. The wheel on one of the paired wheel power mechanisms is connected with the wheel on the other of the paired wheel power mechanisms. The buffer spring mechanisms are arranged between the wheel frames and the wheels. The middle frame deformation mechanism includes a connection unit and two movable units rotatably connected to the connection unit respectively.

9 Claims, 5 Drawing Sheets

MULTIFUNCTIONAL LIGHT-DUTY SOFT ROBOT

TECHNICAL FIELD

The present disclosure relates to the technical field of robotics, in particular to a multifunctional light-duty soft robot.

BACKGROUND

Up to now, the total mileage of China's oil and gas pipelines has exceeded 130,000 kilometers, excluding natural gas and water transportation pipelines. The pipeline transportation industry is huge and growing rapidly. In the face of complex pipeline networks and geographical conditions, it is necessary to use pipeline robots for pipeline inspection and maintenance. The natural gas transportation pipelines are mostly erected in mountains and canyons, winding for thousands of kilometers. At present, most of existing robots for inspection inside pipelines are bulky, and most of them adopt metal frames with high overall structural rigidity. A relative movement is maintained by friction between group wheels and pipe walls. This power transmission mode not only consumes a lot of energy, but produces scratches on the pipe walls to shorten the life of the pipelines.

The pipeline robots are usually used for pipeline inspection. A traditional pipeline robot often adopts a spring-type push-pull structure to reduce a diameter. In actual use, a diameter reduction ratio often may not meet performance requirements of passing through complex pipe networks, so the traditional pipeline robot is suitable for small-range long straight pipe networks and difficult to popularize on a large scale. Meanwhile, most of the pipeline robots focus on operations inside the pipelines, that is, they are merely used for inspection and maintenance of internal pipe bodies. However, many pipeline defects, such as corrosion and external cracks, often occur on external surfaces. Further, an additional device needs to be provided for peripheral inspection of the pipelines, which brings a lot of inconvenience to overhauling. Therefore, a widely used and more flexible and portable detection device is needed for pipeline detection.

SUMMARY

Aiming at the above-mentioned technical problems, the present disclosure aims to provide a multifunctional light-duty soft robot. To solve the above-mentioned technical problems, the present disclosure adopts the following technical solution:

A multifunctional light-duty soft robot, including paired wheel power mechanisms, soft contact mechanisms, buffer spring mechanisms and a middle frame deformation mechanism, wherein each of the paired wheel power mechanisms includes a wheel frame and a wheel rotatably connected to the wheel frame, and the wheel frame is internally provided with a power mechanism connected with a wheel axis of the wheel;

each of the soft contact mechanisms includes a flexible cantilever and a soft transmission belt, the two paired wheel power mechanisms are respectively arranged at two ends of each of the flexible cantilevers, and the wheel on one of the paired wheel power mechanisms is connected with the wheel on the other of the paired wheel power mechanisms by the soft transmission belt;

the buffer spring mechanisms are arranged between the wheel frames and the wheels; and the middle frame deformation mechanism includes a connection unit and two movable units rotatably connected to the connection unit respectively, each of the movable units is provided with limit wheel mechanisms, and the movable units and the connection unit are each provided with a detection assembly.

Beneficially, the power mechanism includes a stepper motor and a deceleration mechanism, an output end of the stepper motor is connected with the deceleration mechanism, and the deceleration mechanism is connected with the wheel axis of the wheel.

Beneficially, each of the movable units is provided with the four limit wheel mechanisms, two of the limit wheel mechanisms are arranged on a side wall of the corresponding movable unit, and the other two limit wheel mechanisms are arranged on another side wall of the corresponding movable unit; and each of the limit wheel mechanisms includes a limit wheel base and a limit wheel rotatably connected to the limit wheel base, and the limit wheel base is fixedly connected to the corresponding movable unit.

Beneficially, the connection unit is provided with steering gears, by which the connection unit is rotatably connected with the movable units. A transmission process may generate a reduction ratio by a gear reduction mechanism to a certain degree.

Beneficially, the detection assembly is a camera.

Beneficially, each of the buffer spring mechanisms includes two springs, each of the springs having one end connected with the wheel frame and the other end connected with a spring baffle arranged on the wheel.

Beneficially, an edge of the wheel is provided with a V-shaped groove, a side wall of the soft transmission belt is provided with a bulge, and the V-shaped side wall of the soft transmission belt and the V-shaped groove are matched and abutted against each other.

Beneficially, the flexible cantilever is made of hard silicone with uniform material.

The present disclosure has the following beneficial effects:

Since the independently driven wheels are used and the surfaces of the soft transmission belts are covered with high-adhesion materials, frictional force may reach two or more times the weight of the robot during the movement on the surface of a pipe body, so that the robot has enough climbing power to move in a smooth space of a pipeline in an attaching manner. In addition to providing effective support, the flexible cantilevers may further actively deform through differential conversion to maximally deform by 1.5 times of the diameter of the wheels and actively adapt to turning and a working space of the reducing pipeline, thereby having higher adaptability to complex and narrow spaces. By the cooperation of rotary connection of the movable units and the connection unit, a non-closed-loop structure and a hollow neutral shaft, robot cylinders may crawl in a surrounding manner for inspection and maintenance of inner and outer walls of pipelines and even bridge columns. Detectable pipeline shapes include but are not limited to cylinders, polygonal cylinders and slit structures, which greatly expands the application range and practical value of the robot. By the steering gears, the surrounding shape of the robot may be changed at will, so the robot may be curled into a circle or flattened into a flat structure and may also have a movement space under extreme conditions such as slit search or wall cracks. Therefore, the present disclosure may be used in the field of special robots.

BRIEF DESCRIPTION OF DRAWINGS

The present disclosure is further described by using the accompanying drawings, but the embodiments in the accompanying drawings do not constitute any limitation to the present disclosure. Those of ordinary skill in the art may also obtain other accompanying drawings according to the following accompanying drawings, without creative efforts.

Figure 1:
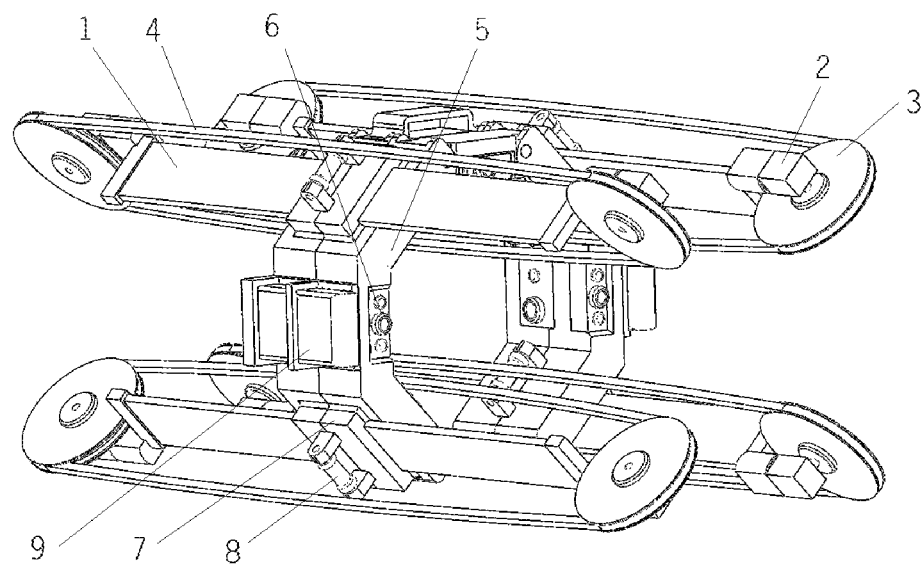
FIG. 1 is a schematic structural diagram of a multifunctional light-duty soft robot provided by the present disclosure.
Figure 2:
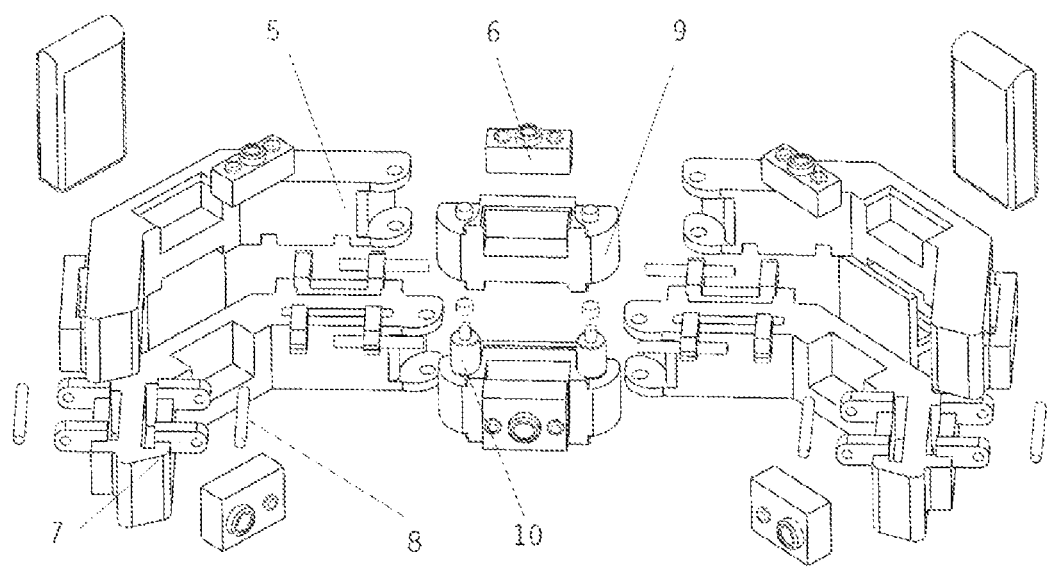
FIG. 2 is an exploded view of movable units and a connection unit in the present disclosure.
Figure 3:
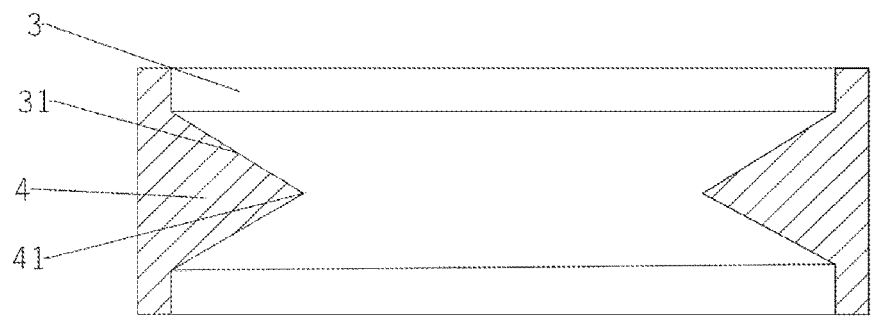
FIG. 3 is a connection structure diagram of a wheel and a soft transmission belt in the present disclosure.
Figure 4:
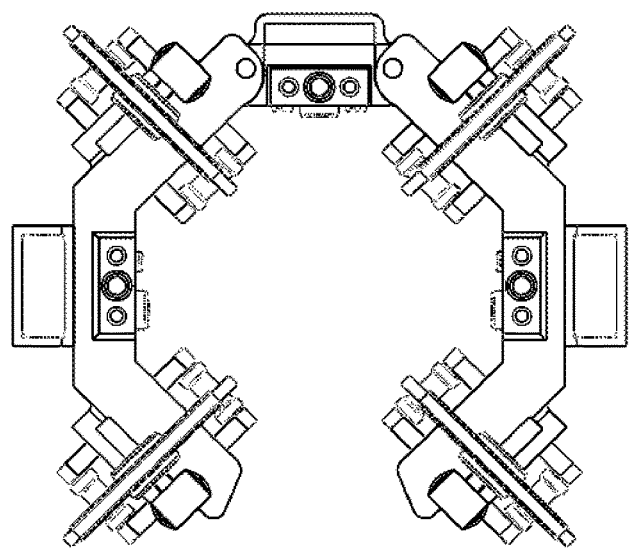
FIG. 4 is a front view of the multifunctional light-duty soft robot provided by the present disclosure.
Figure 5:
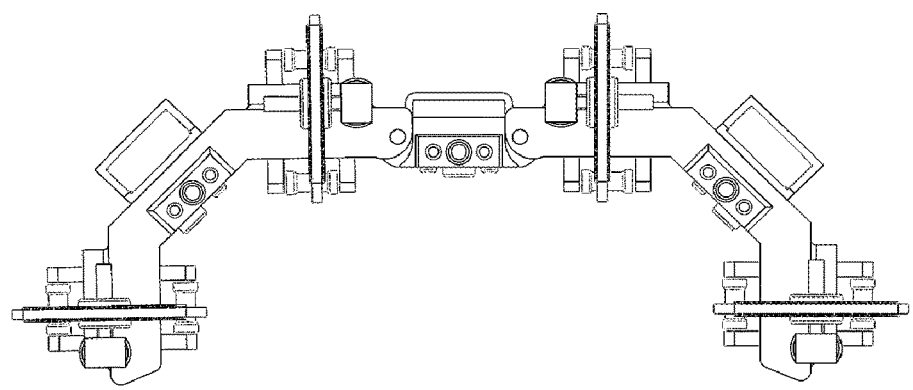
FIG. 5 is a front view of the multifunctional light-duty soft robot in a state according to the present disclosure.

Drawing symbols are as follows: flexible cantilever 1, wheel frame 2, spring 21, wheel 3, V-shaped groove 31, soft transmission belt 4, bulge 41, movable unit 5, camera 6, limit wheel base 7, limit wheel 8, connection unit 9, and steering gear 10.

DETAILED DESCRIPTION OF EMBODIMENTS

The technical solution in the embodiments of the present disclosure is clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

In the description of the present disclosure, it should be noted that the orientation or positional relationship indicated by the terms "vertical", "upper", "lower", "horizontal", etc. is based on the orientation or positional relationship shown in the accompanying drawings, which is merely for the convenience of describing the present disclosure and simplifying the description, rather than indicating or implying that the referred device or element must have a particular orientation and is constructed and operated in the particular orientation. Therefore, it should not be understood to limit the present disclosure. Furthermore, "first", "second", "third", and "fourth" are merely used for descriptive purposes and should not be understood to indicate or imply relative importance.

In the description of the present disclosure, it should also be noted that, unless otherwise expressly specified and limited, the terms "arrangement", "installation", "connected" and "connection" should be understood in a broad sense. For example, it may be a fixed connection, a detachable connection, or an integral connection; moreover, it may be a mechanical connection, or an electrical connection; and it may be directly connected, connected by an intermediate medium, or internal communication between two elements. Those of ordinary skill in the art may understand specific meanings of the above terms in the present disclosure according to specific circumstances.

As shown in FIGS. 1-8, a multifunctional light-duty soft robot includes paired wheel power mechanisms, soft contact mechanisms, buffer spring mechanisms and a middle frame deformation mechanism;

each of the paired wheel power mechanisms includes a wheel frame 2 and a wheel 3, the wheel 3 is rotatably connected to the wheel frame 2, and the wheel frame 2 is internally provided with a power mechanism connected with a wheel axis of the wheel 3;

each of the soft contact mechanisms includes a flexible cantilever 1 and a soft transmission belt 4, the two paired wheel power mechanisms are respectively arranged at two ends of each of the flexible cantilevers 1, and the wheel 3 on one of the paired wheel power mechanisms is connected with the wheel 3 on the other of the paired wheel power mechanisms by the soft transmission belt 4;

the buffer spring mechanisms are arranged between the wheel frames 2 and the wheels 3; and the middle frame deformation mechanism includes a connection unit 9 and two movable units 5, the two movable units 5 are rotatably connected to the connection unit 9 respectively, each of the movable units 5 is provided with a limit wheel mechanism, and the movable units 5 and the connection unit 9 are each provided with a detection assembly.

According to an optional embodiment of the present disclosure, the power mechanism includes a stepper motor and a deceleration mechanism, an output end of the stepper motor is connected with the deceleration mechanism, and the deceleration mechanism is connected with the wheel axis of the wheel 3.

According to an optional embodiment of the present disclosure, each of the movable units 5 is provided with the four limit wheel mechanisms, two of the limit wheel mechanisms are arranged on a side wall of the corresponding movable unit 5, and the other two limit wheel mechanisms are arranged on another side wall of the corresponding movable unit 5; and each of the limit wheel mechanisms comprises a limit wheel base 7 and a limit wheel 8, the limit wheel 8 is rotatably connected to the limit wheel base 7, and the limit wheel base 7 is fixedly connected to the corresponding movable unit 5.

According to an optional embodiment of the present disclosure, the connection unit 9 is provided with steering gears 10, and the connection unit 9 is rotatably connected with the movable units 5 by the steering gears 10.

According to an optional embodiment of the present disclosure, the detection assembly is a camera 6.

According to an optional embodiment of the present disclosure, each of the buffer spring mechanisms includes two springs 21, one end of each of the springs 21 is connected with the wheel frame 2, and the other end of each of the springs 21 is connected with a spring baffle arranged on the wheel 3.

According to an optional embodiment of the present disclosure, an edge of the wheel 3 is provided with a V-shaped groove 31, a side wall of the soft transmission belt 4 is provided with a bulge 41, and the V-shaped side wall of the soft transmission belt 4 and the V-shaped groove 31 are matched and abutted against each other.

According to an optional embodiment of the present disclosure, the flexible cantilever 1 is made of hard silicone.

Figure 6:
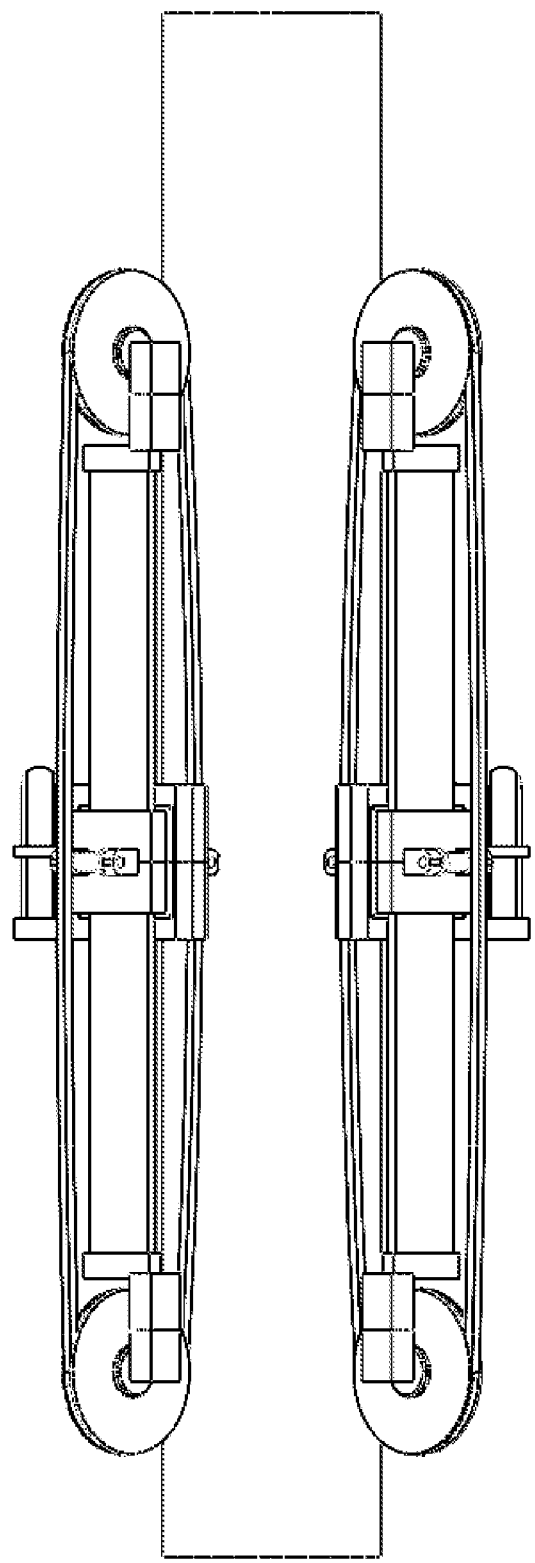
FIG. 6 is a schematic structural diagram of the multifunctional light-duty soft robot during the operation on an outer wall of a pipeline according to the present disclosure.

An implementation process is as follows:

When it is necessary to clean an outer wall of a pipeline, as shown in FIG. 6, firstly the steering gears 10 are controlled to keep the two movable units 5 away, the robot is placed outside the outer wall of the pipeline, and then the steering gears 10 are controlled to make the two movable units 5 close, so that all the wheels 3 press the soft transmission belts 4, the soft transmission belts 4 and the outer wall of the pipeline are tightly abutted, and the robot holds the outer wall of the pipeline tightly; and the stepper motors are started, output ends of the stepper motors drive deceleration mechanisms, the deceleration mechanisms drive the wheels 3 to rotate, the soft transmission belts 4 are driven by the wheels 3, and a transmission reduction ratio within a certain range may be realized through the deceleration mechanisms, so that the robot may move on the outer wall of the pipeline; and the outer wall of the pipeline is photographed and detected by the cameras 6 during the movement.

Due to the existence of the limit wheels 8 and the soft transmission belts 4, only the soft transmission belts 4 are in direct contact with the pipeline during the movement of the robot, thereby effectively avoiding wear of other structures of the robot.

Since the soft transmission belts 4 are detachable, only the soft transmission belts 4 need to be replaced after being worn, which greatly reduces the cost and improves the maintainability. Of course, applicable working scenarios of the embodiments of the present disclosure are far from being limited to the contents listed above, and the mechanisms described in the contents of the present disclosure and used in other different scenarios are also reasonable.

The outer wall of the pipeline may either have a rough surface such as cement and marble, or a smooth surface such as glass, iron pillars, etc.

Figure 7:
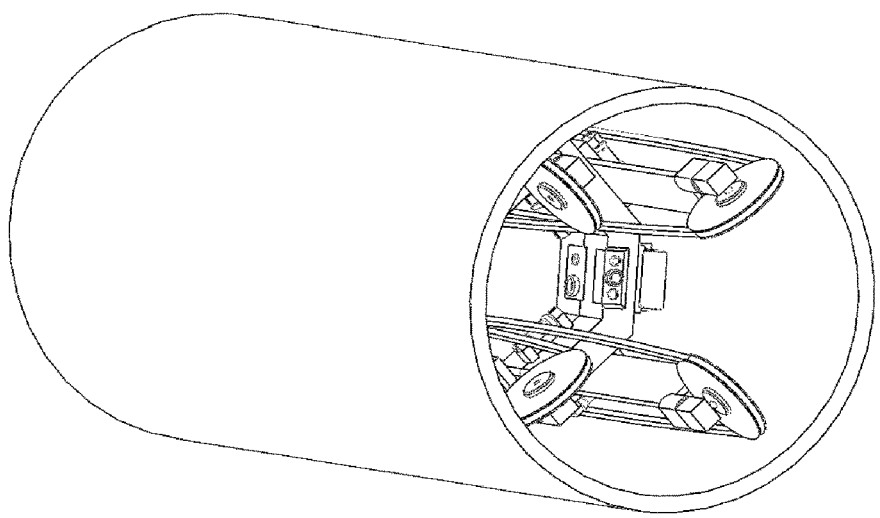
FIG. 7 is a schematic structural diagram of the multifunctional light-duty soft robot during the operation on an inner wall of the pipeline according to the present disclosure.
Figure 8:
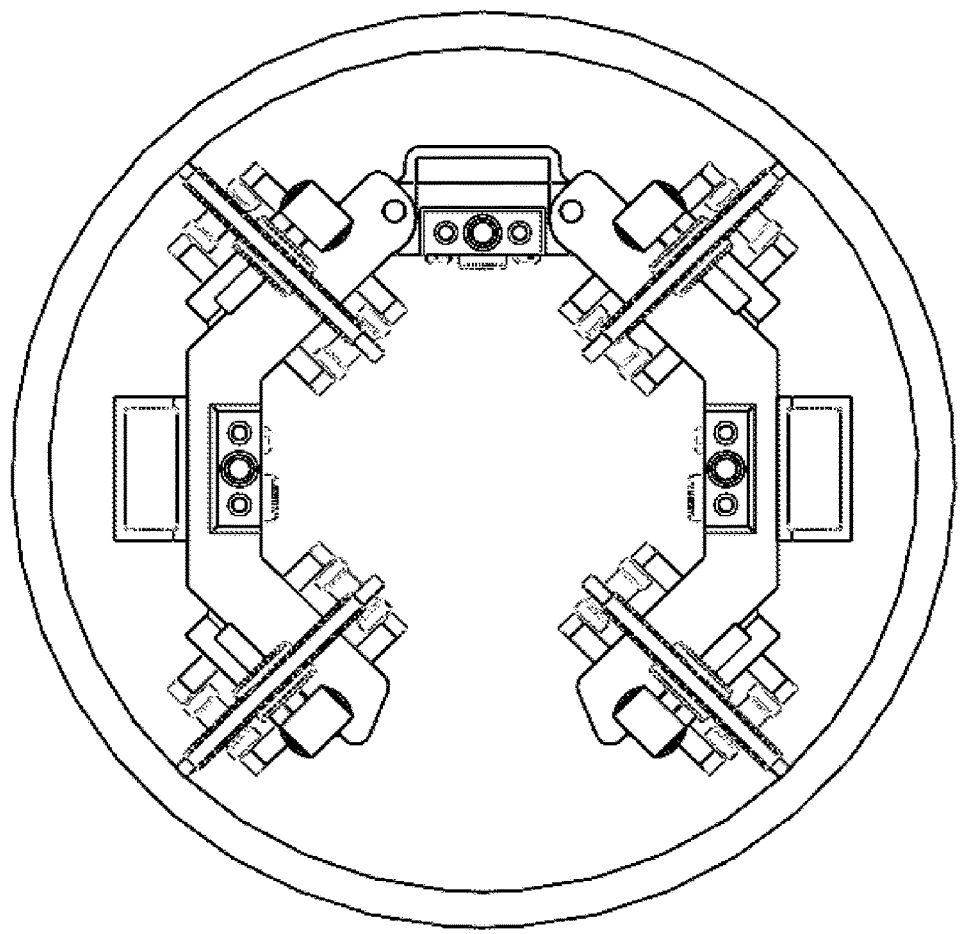
FIG. 8 is a front view of FIG. 7 of the present disclosure.

When an inner wall of the pipeline needs to be cleaned, as shown in FIGS. 7-8, the steering gears 10 are controlled to make the two movable units 5 close first, the robot is extended into the inner wall of the pipeline, and then the steering gears 10 are controlled to keep the two movable units 5 away, thereby making all the wheels 3 and the soft transmission belts 4 support the robot in the pipeline; by using the same principle as above, the robot moves in the pipeline and make a photographing detection; when encountering a reducing area, for example, the radius of the pipe wall in a front area is reduced and the deformation caused by a forward thrust together with the flexible cantilevers 1 is not enough to support the front wheels 3 to enter the reducing area, a differential deformation function will come into play; at this time, a same pair of the driving wheels on upper and lower sides are driven separately to generate a speed difference for making the front wheels 3 faster than the rear wheels 3, and the soft transmission belts 4 will be tensioned on an inner side of the movement and slacked on an outer side due to a differential speed; during the tensioning, a bending moment is applied to the flexible cantilevers 1 to generate corresponding deformation; under the condition that static frictional force between the wheels 3 and the soft transmission belts 4 is greater than tension force, the high the differential speed is, the greater the deformation is; at this time, the front wheels are simultaneously or partially retracted to enter the reducing area; after a first half section of the robot enters the reducing area, the rear wheels 3 work in the same way; and therefore, diameter reduction is completed through the above steps. In addition to reducing the diameter, when the robot encounters a branch of the pipeline, a driving wheel set at a corresponding position is differentially deformed based on the same principle, and a "tentacle" at a forward movement end is driven to extend to a wall of the branch of the pipeline to be entered, so as to selectively enter the internal branch of the pipeline. Therefore, through the above steps, the robot provided by the present disclosure may flexibly change direction and implement diameter reduction in a complex pipe network system.

The flexible cantilever 1 is made of the hard silicone, the soft transmission belt 4 is cast with soft silicone, and an outer side wall of the soft transmission belt 4 is sprayed with a high-adhesion material to further increase a damping coefficient. When the axial rigidity of the flexible cantilever 1 is large, the longitudinal rigidity may satisfy tensile deformation in a certain range.

The springs 21 may realize a buffer connection between the wheel frames 2 and the wheels 3.

A gap is formed between the limit wheel 8 and the limit wheel base 7, so that the soft transmission belt 4 may pass smoothly without contacting the limit wheel base 7.

The connection unit 9 is provided with installation through holes, and the steering gears 10 are installed on the installation through holes, so that a maximum rotation angle of ninety degrees may be realized between each of the movable units 5 and the connection unit 9.

The whole robot does not have a head-to-tail connection structure, that is, a closed-loop structure is not formed; and an open structure is adopted, that is, the two movable units 5 are only connected by the connection unit 9, and the other two ends of the two movable units 5 are not connected.

A lighting device is capable of providing light for the corresponding camera 6 in a dark environment, and may be an LED lighting lamp bead.

Figure 9:
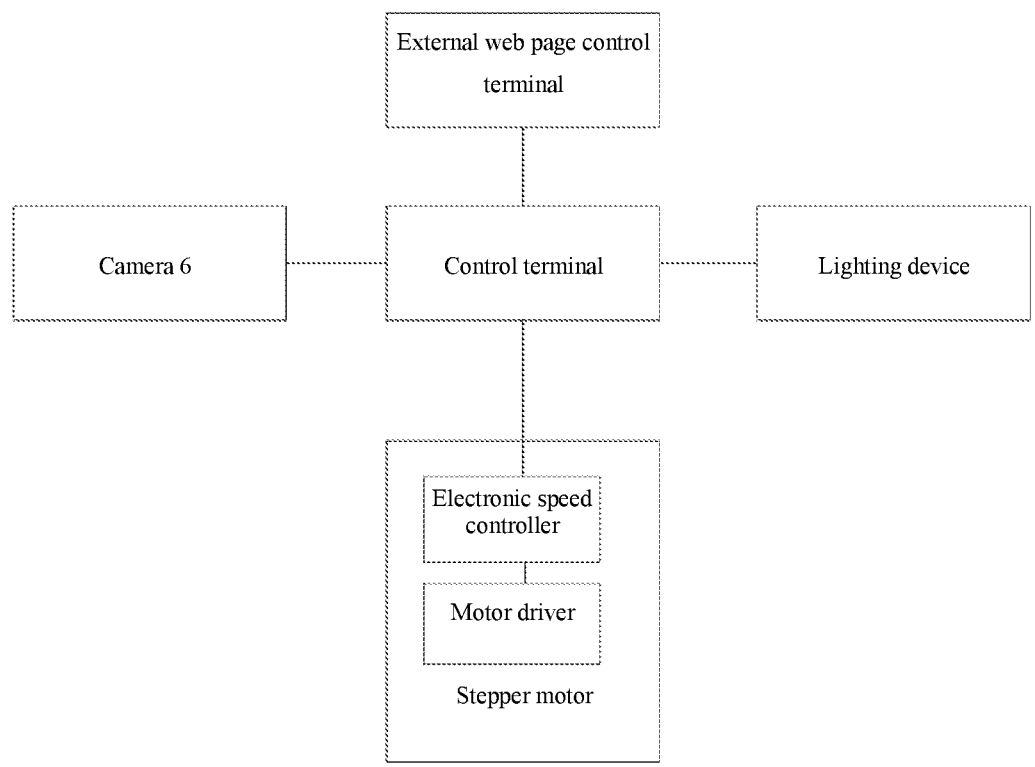
FIG. 9 is a circuit connection relationship diagram of the present disclosure.

FIG. 9 shows the circuit connection relationship diagram of the present disclosure, each of the movable units 5 is further internally provided with a control terminal, and external web page control terminals, the cameras 6, the lighting devices and all the stepper motors are electrically connected with the control terminals respectively; and control signals sent by the control terminals are transmitted to an electronic speed controller, and the electronic speed controller adjusts working states of motor drivers according to the control signals, thereby adjusting working states of the stepper motors.

Commands sent by the control terminals include 7 kinds of data, which needs to be converted into speed and direction control of the 8 stepper motors. In fact, the 7 control signals are converted into 16 pwm control signals.

An algorithm is described by a C language as follows:

Input signals include:

Steering directions: to_x; to_y

Total power: data_mod_web [0]

Bending of 4 flexible arms: b1, b2, b3, b4 (determined by the number of flexible arms)

The following intermediate variables are defined: double $m=0$, $n=0$, to[5]={0}, mod[8]={0}$;

a calculation process is as follows:

process 1: data is converted, and there are 2 sets of data after conversion.

$$m=((double)(to\_x-to\_y))/1.414;$$

$$n=((double)(to\_x+to\_y))/1.414;$$

process 2: forward data is added, and there are 4 sets of data after conversion.

to[1]=(−$m$*40)+16*data_mod_web[0];

to[2]=(−$n$*40)+16*data_mod_web[0];

to[3]=($m$*40)+16*data_mod_web[0];

to[4]=($n$*40)+16*data_mod_web[0];

process 3: data overflow is prevented to keep data within a certain range.

process 4: data of bending of flexible arms is added through a cycle, and there are 8 sets of data after conversion.

mod[$i$_mod]=to[$i$_mod/2+1]+(double)((data_mod_web[$i$_mod/2+1]*400)*($i$_mod_%2?−1:1))

process 5: the above 8 sets of motor power data is converted into 16 sets of 12-bit pwm data, and the data is ensured not to overflow.

Since the independently driven wheels 3 are used and the surfaces of the soft transmission belts 4 are covered with high-adhesion materials, frictional force may reach two or more times the weight of the robot during the movement on the surface of a pipe body, so that the robot has enough climbing power to move in a smooth space of a pipeline in an attaching manner. In addition to providing effective support, the flexible cantilevers 1 may further actively deform through differential conversion to maximally deform by 1.5 times of the diameter of the wheels 3 and actively adapt to turning and a working space of the reducing pipeline, thereby having higher adaptability to complex and narrow spaces. By the cooperation of rotary connection of the movable units 5 and the connection unit 9, a non-closed-loop structure and a hollow neutral shaft, robot cylinders may crawl in a surrounding manner for inspection and maintenance of inner and outer walls of pipelines and even bridge columns. Detectable pipeline shapes include but are not limited to cylinders, polygonal cylinders and slit structures, which greatly expands the application range and practical value of the robot. By the steering gears 10 for change of angles, the surrounding shape of the robot may be changed at will, so the robot may be curled into a circle or flattened into a flat structure and may also have a movement space under extreme conditions such as slit search or wall cracks. Therefore, the robot is used as a special robot.

The components, modules, mechanisms and devices whose structures are not described in detail in the present disclosure are all common standard components or components known to those skilled in the art, and their structures and principles are known to those skilled in the art through technical manuals or through routine experimental methods.

Finally, it should be noted that the above embodiments are merely used to illustrate the technical solution of the present disclosure, but not to limit the scope of protection of the present disclosure. Although the present disclosure has been described in detail with reference to the more preferred embodiments, those of ordinary skill in the art should understand that the technical solution of the present disclosure may be modified or equivalently replaced without departing from the spirit and scope of the technical solution of the present disclosure.

What is claimed:

1. A multifunctional light-duty soft robot, comprising paired wheel power mechanisms, soft contact mechanisms, buffer spring mechanisms and a middle frame deformation mechanism, wherein
   each of the paired wheel power mechanisms comprises a wheel frame and a wheel rotatably connected to the wheel frame, and the wheel frame is internally provided with a power mechanism connected with a wheel axis of the wheel;
   each of the soft contact mechanisms comprises a flexible cantilever and a soft transmission belt, the two paired wheel power mechanisms are respectively arranged at two ends of each of the flexible cantilevers, and the wheel on one of the paired wheel power mechanisms is connected with the wheel on the other of the paired wheel power mechanisms by the soft transmission belt;
   the buffer spring mechanisms are arranged between the wheel frames and the wheels; and
   the middle frame deformation mechanism comprises a connection unit and two movable units rotatably connected to the connection unit respectively, each of the movable units is provided with limit wheel mechanisms, and the movable units and the connection unit are each provided with a detection assembly.

2. The multifunctional light-duty soft robot according to claim 1, wherein the power mechanism comprises a stepper motor and a deceleration mechanism, an output end of the stepper motor is connected with the deceleration mechanism, and the deceleration mechanism is connected with the wheel axis of the wheel.

3. The multifunctional light-duty soft robot according to claim 2, wherein each of the movable units is provided with the four limit wheel mechanisms, two of the limit wheel mechanisms are arranged on a side wall of the corresponding movable unit, and the other two limit wheel mechanisms are arranged on another side wall of the corresponding movable unit; and
   each of the limit wheel mechanisms comprises a limit wheel base and a limit wheel rotatably connected to the limit wheel base, and the limit wheel base is fixedly connected to the corresponding movable unit.

4. The multifunctional light-duty soft robot according to claim 3, wherein the connection unit is provided with steering gears, by which the connection unit is rotatably connected with the movable units.

5. The multifunctional light-duty soft robot according to claim 4, wherein the detection assembly is a camera.

6. The multifunctional light-duty soft robot according to claim 5, wherein each of the buffer spring mechanisms comprises two springs, each of the springs having one end connected with the wheel frame and the other end connected with a spring baffle arranged on the wheel.

7. The multifunctional light-duty soft robot according to claim 6, wherein an edge of the wheel is provided with a V-shaped groove, a side wall of the soft transmission belt is provided with a bulge, and the V-shaped side wall of the soft transmission belt and the V-shaped groove are matched and abutted against each other.

8. The multifunctional light-duty soft robot according to claim 7, wherein the wheel frame is provided with a lighting device.

9. The multifunctional light-duty soft robot according to claim 1, wherein the flexible cantilever is made of hard silicone.

* * * * *